United States Patent
Allain et al.

(10) Patent No.: US 6,393,806 B1
(45) Date of Patent: May 28, 2002

(54) RAMP APPARATUS AND METHOD FOR USE WITH MOTOR VEHICLE FLOOD PROTECTION BAG

(76) Inventors: Mark Allain, 3732 Silver Maple Ct., New Orleans, LA (US) 70131; Joseph Allain, Jr., 4932 Chantilly Dr., New Orleans, LA (US) 70126

( * ) Notice: Subject to any disclaimer, the term of this patent is extended or adjusted under 35 U.S.C. 154(b) by 0 days.

(21) Appl. No.: 09/444,862

(22) Filed: Nov. 22, 1999

Related U.S. Application Data

(60) Provisional application No. 60/111,276, filed on Dec. 7, 1998.

(51) Int. Cl.[7] ............................... B65B 5/04; B65B 7/02
(52) U.S. Cl. ........................................ 53/469; 53/138.4
(58) Field of Search .............................. 53/138.4, 469, 53/478; 105/436; 52/153

(56) References Cited

U.S. PATENT DOCUMENTS

| | | | | | |
|---|---|---|---|---|---|
| 3,474,803 A | * | 10/1969 | Davis | ........................ | 206/335 |
| 4,315,535 A | * | 2/1982 | Battle | ........................ | 206/335 |
| 4,979,339 A | * | 12/1990 | Jones et al. | ................. | 150/166 |
| 5,176,421 A | * | 1/1993 | Fasiska | ....................... | 150/166 |
| 5,282,502 A | * | 2/1994 | Ballard | ....................... | 206/335 |
| 5,544,861 A | * | 8/1996 | Wisner | ....................... | 254/88 |

* cited by examiner

Primary Examiner—Scott A. Smith
Assistant Examiner—Chukwurah Nathaniel
(74) Attorney, Agent, or Firm—Jim Zegeer

(57) ABSTRACT

A ramp apparatus and method for insertion of a four-wheel vehicle into a plastic flood protection car bag which comprises a ramp device having a pair of up-ramp surfaces, a pair of top surfaces and a pair of down-ramp surfaces, and car bag securements on the top surfaces for holding an open edge of the car bag while the four-wheel vehicle is rolled on the up- and down-ramp surfaces and into the car bag.

3 Claims, 5 Drawing Sheets

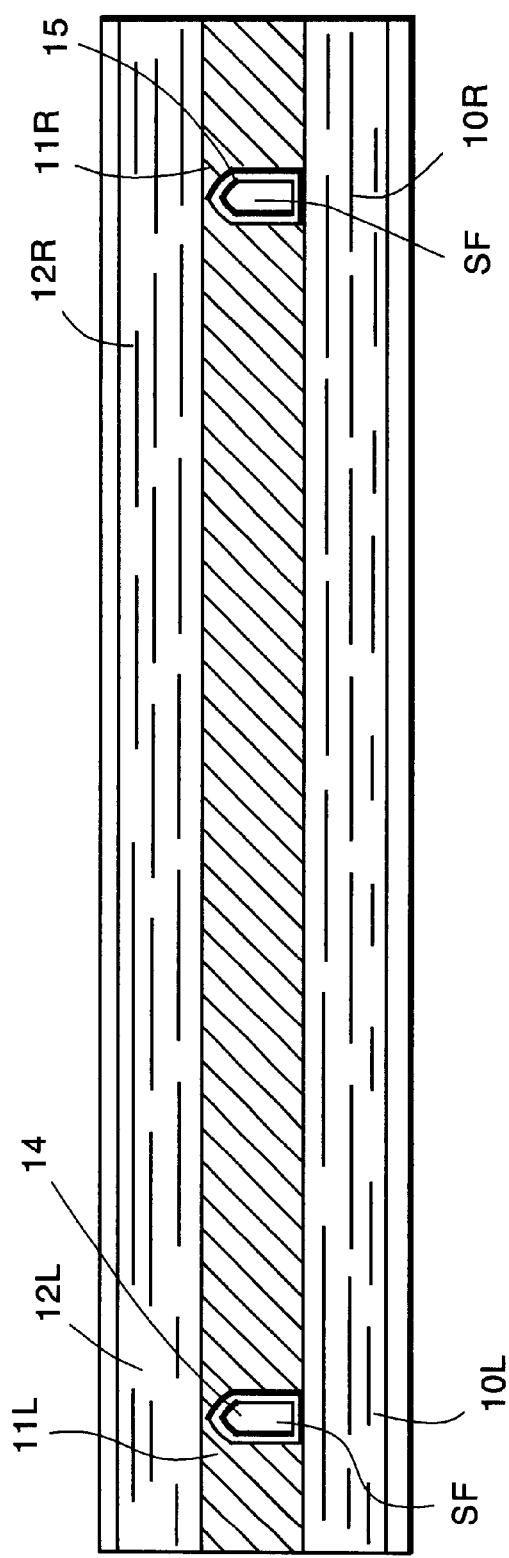
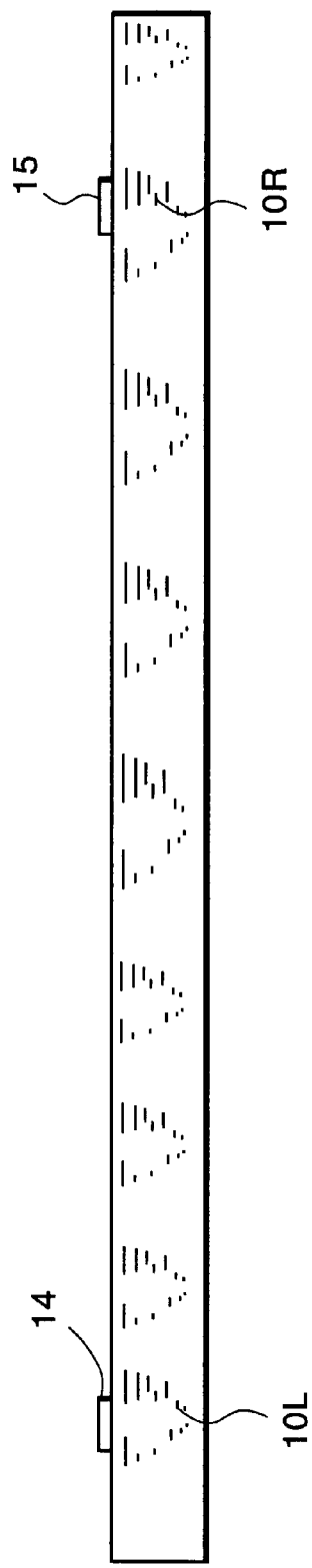

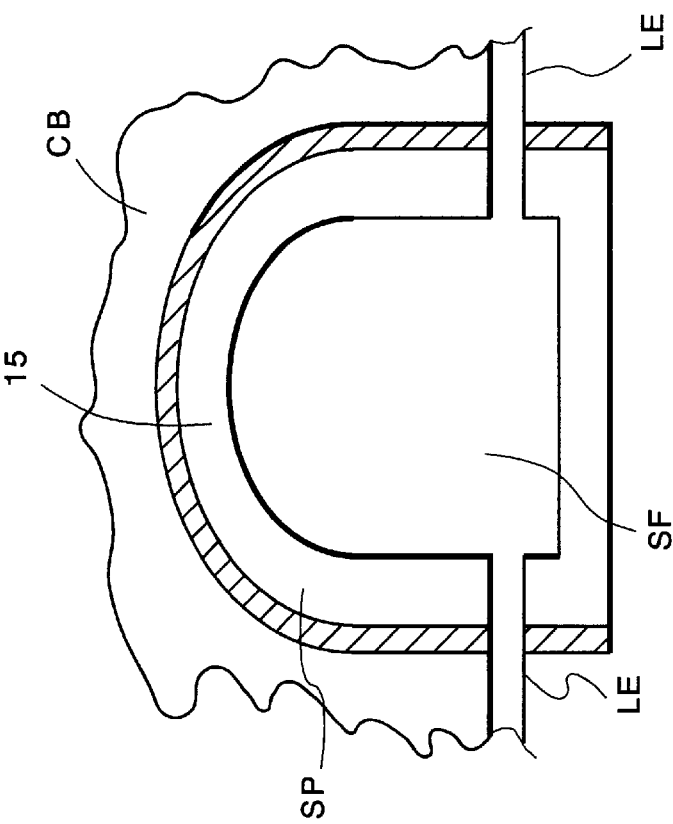
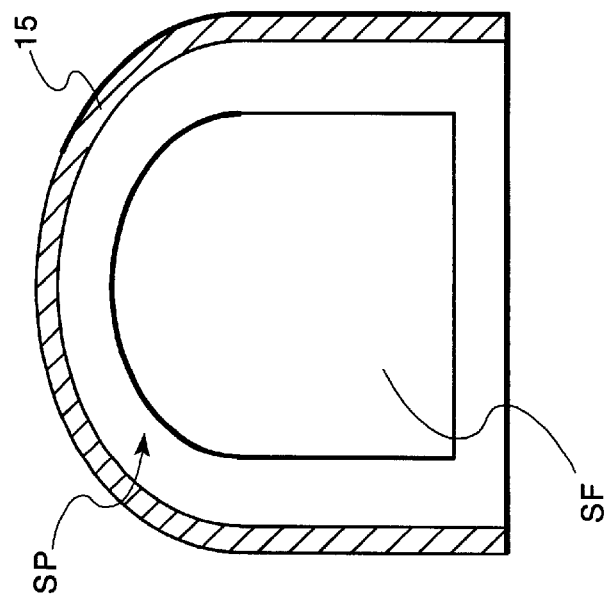
FIG. 7A
FIG. 7B

RAMP APPARATUS AND METHOD FOR USE WITH MOTOR VEHICLE FLOOD PROTECTION BAG

REFERENCE TO RELATED APPLICATION

The present application is based on provisional application No. 60/111,276 filed Dec. 7, 1998 entitled RAMP APPARATUS AND METHOD FOR USE WITH MOTOR VEHICLE FLOOD PROTECTION BAG.

BACKGROUND AND BRIEF DESCRIPTION OF THE INVENTION

In our patent application Ser. No. 08/660,663 filed Jun. 5, 1996 for MOTOR VEHICLE AND VALUABLE POSSESSION FLOOD PROTECTION APPARATUS AND METHOD; in our continuation-in-part application Ser. No. 09/014,995 filed Jan. 28, 1998 for MOTOR VEHICLE PROTECTION APPARATUS AND METHOD; and in our application Ser. No. 09/102,667 filed Jun. 23, 1998 for AUTOMOBILE FLOOD PROTECTION SYSTEM AND METHOD, as well as other pending applications, we disclose vehicle flood protection apparatus and methods in which four-wheel vehicles are rolled into a plastic bag and then the open end of the bag is sealed such that the bag with the vehicle in it floats. The bag is tethered or anchored to a stationary object and thus thereby protected from damage by flood waters. Typically, the bag is placed on a flat surface such as a driveway, and then the open end held open while the vehicle is rolled or driven into the bag through the open end. Then the open end of the bag is rolled up on a rod and sealed by clamps or other seal system and then anchored, preferably at both ends, such that when flood waters arrive the vehicle is protected from damage by flood waters.

The present invention deals with the situation where the flood waters have accumulated a few inches or more and cover the ground. In this situation, the present invention provides a two-sided ramp device having an up-side ramp, a top surface above the water accumulation at the time of use and a down-side ramp. The top surface preferably carries one or more clips or one element of hook-and-loop fasteners. The open end of the flood protection bag is secured under the clip or carries a opposite element of the hook-and-loop fastener system so that the lower edge of the open end of the bag is held or maintained stationary while the bag is held maintained open. The car or vehicle is then driven up the up-side ramp and into the bag and down the down-side ramp of the ramp device, with the front wheels and then continuing into the bag with the rear wheels coming up the up-side ramp and down the down-side ramp on the opposite side, and then the bag is closed as described in the above patent applications. Care is taken to be sure that the ramp height is approximately one inch below the undercarriage of the vehicle.

DESCRIPTION OF THE DRAWINGS

The above and other objects, advantages and features of the invention will become more apparent when considered with the following specification and accompanying drawings wherein:

FIG. 5 is a top plan view of the ramp according to the invention, FIG. 6 is a front elevational view of a ramp incorporating the invention, and FIGS. 7A and 7B are enlarged views of clamps or clips incorporated in the invention.

DETAILED DESCRIPTION OF THE INVENTION

Figure 1:
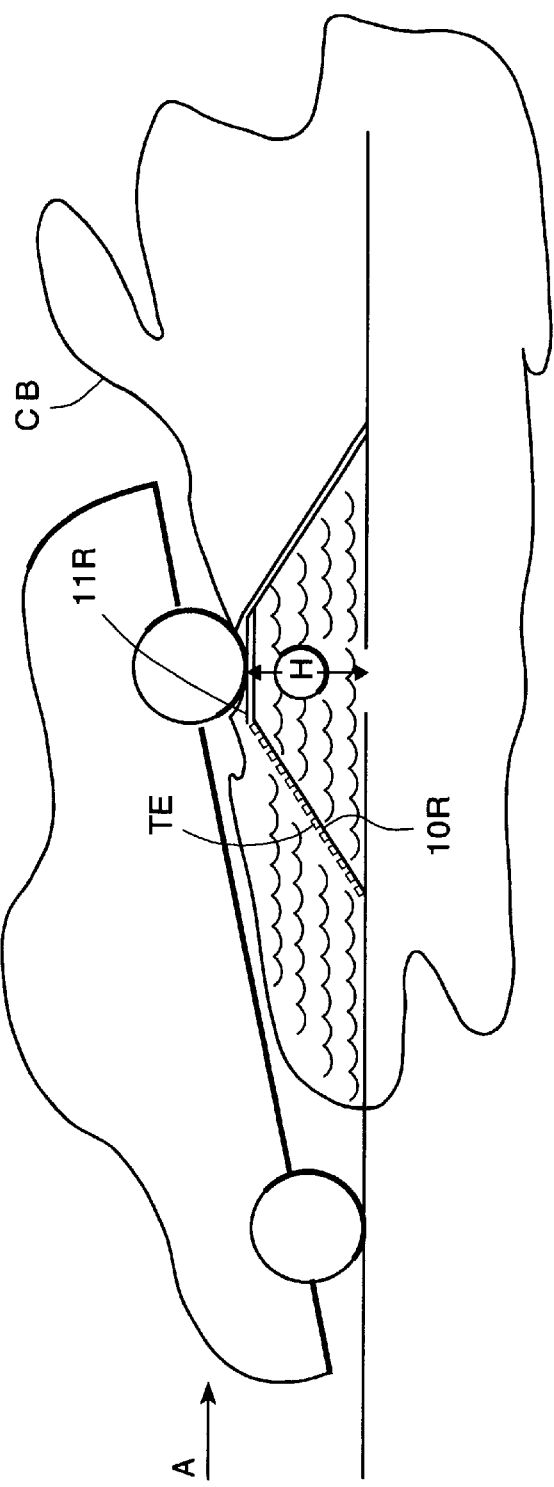
FIG. 1 is a side elevational view of a car bag ramp incorporating the invention.
Figure 2:
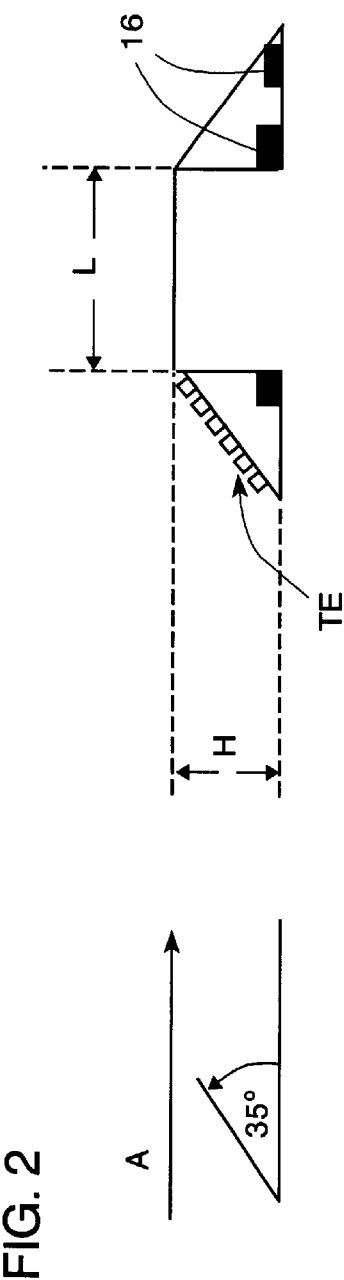
FIG. 2 is a side elevational view of an embodiment of the invention.
Figure 3A:
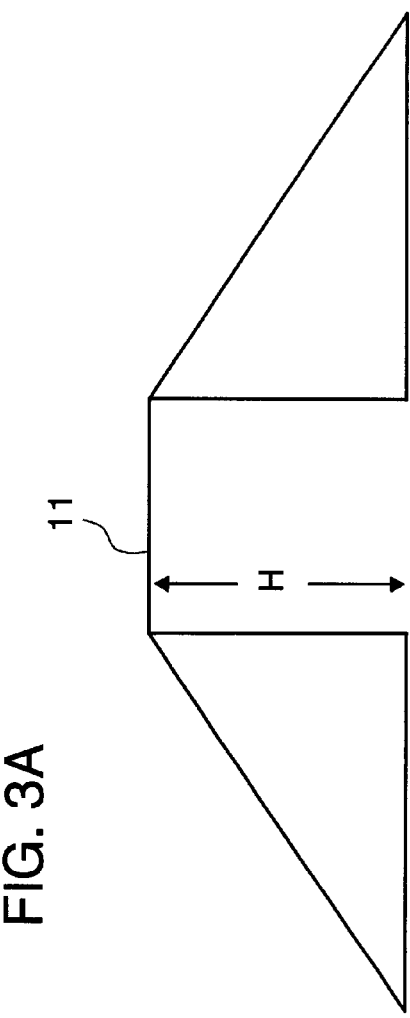
FIGS. 3A, 3B and 3C illustrate different heights of the ramp.
Figure 3B:
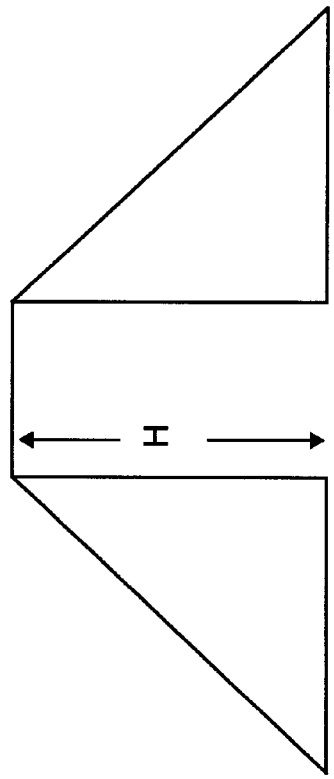
Figure 3C:
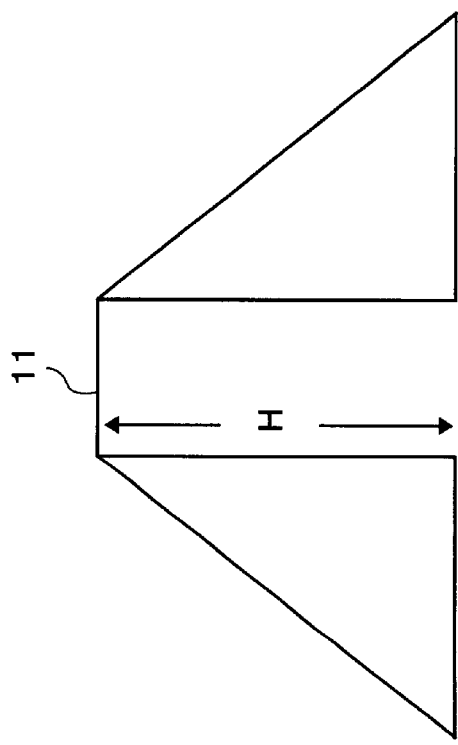

The invention is particularly adapted for use with car bags for protecting vehicles against flood waters, particularly when there has been a sudden accumulation of a few inches or more of water which covers the ground. The ramp of the present invention is a two-sided vehicle ramp having an up-side ramp surface top surface for attachment of the car bag at the lower edge thereof, and a downside ramp surface to allow the vehicle to be driven off of the ramp and into the car bag and then the car bag is sealed in the manner disclosed in our above referenced patent applications.

Although the car ramp is shown as being integral, it will be appreciated that a pair of separate and discrete left and right wheel ramps can be used in the practice of the invention Referring to the drawings, the car bag ramp device of the invention has up-ramp surface sides 10L, 10R which may be corrugated or roughened for traction purposes or have traction inducing or enhancing means thereon TE, and flat upper surfaces 11L, 11R which have bag clips or securement means to be described more fully hereinafter, down-ramp sides 12L, 12R. The ramp surfaces 10L and 10R are spaced apart a given distance corresponding to the spacing between typical vehicle wheels, but in any case wide enough for a given vehicle to engage the up-ramp surfaces 10L, 10R by the front wheels simultaneously. The top surfaces 11L, 11R are planar or flat and have clips or bag-securement means 14 and 15 (see FIG. 5) to which the lower front edge of the car bag CB disclosed in our above-identified patent applications is attached. The attachment clips 14, 15 may be spring clips having spring fingers SF under which the edge FE of the car bag CB is slipped (space SP between the spring fingers SF and the edge of the attachment clips are provided for insertion of the lower edge LE of the car bag CB as shown in FIG. 7B.) and held in place so that the upper edges of the bag can be held open while the car or vehicle is driven into the bag.

Figure 4:
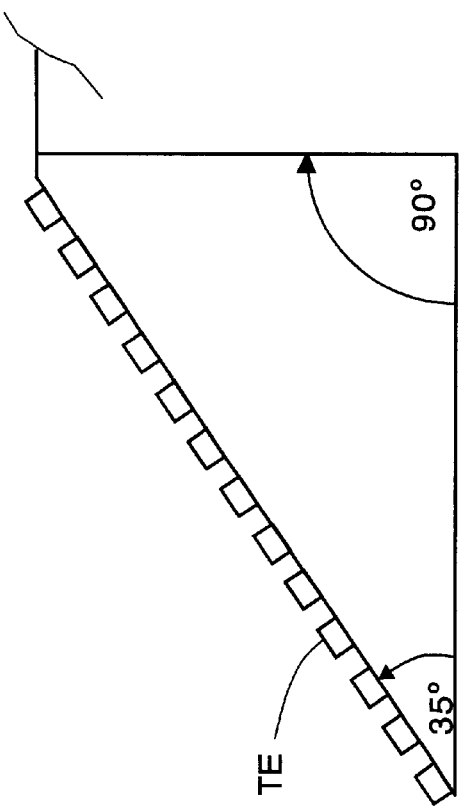
FIG. 4 is a side elevational view of a further embodiment of the invention.

FIG. 5A shows the clip in the enlarged view. A space between the clip spring fingers SF for insertion of the lower edge of the bag, and a metal, rubber or plastic cone which is adapted to apply spring pressure on the inside surface of the front edge of the car bag. While in FIGS. 4 and 5 the car bag ramp is shown as a integral one-piece member, it will be appreciated that can be formed in two sections spaced sufficient to accommodate the spaced wheels of a vehicle. Lead or sandbag weights 16 may be used for stability.

Instead of spring clips, hook-and-loop type fasteners may be used with one of the hook-and-look elements being secured to the front lower edge of the car bag. The ramps can be made of metal, plastic, fiberglass or wood or combinations of these materials. The hollow spaces can be used to store the plaster car bag.

DIRECTIONS FOR USING THE CAR BAG RAMP

When flood water has already accumulated in an area where the user desires to protect the car in a car bag CB, use of the car bag ramp will be helpful to place the car in the car bag with minimal entrance of flood water into the bag.

1. Select a ramp that is higher than the level of the water (preferably by one or two inches). In one preferred technique, if water is moving, position the entrance end (10L, 10R) of the ramp (side with cleats) on the opposite side to the direction of water movement, i.e., enter the bag in the opposite direction to the water current flow (arrow A).
2. Place the lower edge of the bag opening in the clips 14, 15 provided at both sides of the ramp.
3. Allow for some looseness in the lower bag layer adjacent to the ramp (6 to 12 inches), depending on flood water heights, so that as the car (vehicle) enters the bag, excess tension will not be placed on the bag edge in the clips as the car rolls down from the ramp height.
4. After the car (vehicle) is in the bag, remove the ramp devices immediately, fold the open end of the bag according to directions provided with the bag and clamp the bag closed.

While the invention has been described in relation to preferred embodiments of the invention, it will be appreciated that other embodiments, adaptations and modifications of the invention will be apparent to those skilled in the art.

We claim:

1. A method of inserting a wheeled vehicle in a flood protection car bag having an open end with a lower edge, comprising:

providing a ramp device for the vehicle wheels, said ramp device having up- and down-ramp surfaces and a top surface, securing the lower edge of the car bag to said top surface of the ramp device, moving the vehicle's front wheels up the up-ramp surfaces and into the car bag and then down the down-ramp surfaces of the ramp device, continuing to move the vehicle into the car bag until the rear wheels go up the up-ramp surface and down the down-ramp surface and into the car bag, after the vehicle is fully in the car bag, unsecuring said lower edge and closing the open bag end.

2. A method of inserting a wheeled vehicle in a flood protection car bag having an open end with a lower edge, comprising:

providing a ramp device for the vehicle wheels, said ramp device having up- and down-ramp surfaces and a top surface, securing the lower edge of the car bag to said top surface of the ramp device, moving the vehicle's front wheels up the up-ramp surfaces and into the car bag and then down the down-ramp surfaces of the ramp device, continuing to move the vehicle into the car bag until the rear wheels go up the up-ramp surface and down the down-ramp surface and into the car bag, after the vehicle is fully in the car bag, sealing the open bag end.

3. A method of inserting a wheeled vehicle in a flood protection car bag having an open end with a lower edge, comprising:

providing a ramp device for the vehicle wheels, said ramp device having up- and down-ramp surfaces and a top surface, securing the lower edge of the car bag to said top surface of the ramp device, moving the vehicle's front wheels up the up-ramp surfaces and into the car bag and then down the down-ramp surfaces of the ramp device, continuing to move the vehicle into the car bag until the rear wheels go up the up-ramp surface and down the down-ramp surface and into the car bag, after the vehicle is fully in the car bag, unsecuring said lower edge and rolling the open bag end and then clamping same.

* * * * *